(No Model.)   8 Sheets—Sheet 2.

F. EGGE.
MACHINE FOR SETTING LACING HOOKS.

No. 476,006.   Patented May 31, 1892.

WITNESSES:
J. F. Finch
J. S. Williamson

INVENTOR
F. Egge
BY F. W. Smith Jr.
ATTORNEY (No Model.) 8 Sheets—Sheet 4.

F. EGGE.
MACHINE FOR SETTING LACING HOOKS.

No. 476,006. Patented May 31, 1892.

WITNESSES:
J. J. Finch
S. Williamson.

INVENTOR
F. Egge
BY F. W. Smith Jr.
ATTORNEY (No Model.)  8 Sheets—Sheet 6.

F. EGGE.
MACHINE FOR SETTING LACING HOOKS.

No. 476,006. Patented May 31, 1892.

WITNESSES:
J. J. Finch.
S. S. Williamson.

INVENTOR
F. Egge
BY F. W. Smith Jr.
ATTORNEY (No Model.) 8 Sheets—Sheet 7.

F. EGGE.
MACHINE FOR SETTING LACING HOOKS.

No. 476,006. Patented May 31, 1892.

WITNESSES:
J. F. Finch
S. S. Williamson

INVENTOR
F. Egge
BY F. W. Smith Jr.
ATTORNEY (No Model.) 8 Sheets—Sheet 8.

F. EGGE.
MACHINE FOR SETTING LACING HOOKS.

No. 476,006. Patented May 31, 1892.

WITNESSES:
J. W. Finch
S. S. Williamson

INVENTOR
F. Egge
BY F. W. Smith Jr.
ATTORNEY

UNITED STATES PATENT OFFICE.

FREDERICK EGGE, OF BRIDGEPORT, CONNECTICUT, ASSIGNOR TO THE SMIDT & PUPKE MANUFACTURING COMPANY, OF NEW YORK, N. Y.

MACHINE FOR SETTING LACING-HOOKS.

SPECIFICATION forming part of Letters Patent No. 476,006, dated May 31, 1892.

Application filed January 13, 1891. Serial No. 377,653. (No model.)

*To all whom it may concern:*

Be it known that I, FREDERICK EGGE, a citizen of the United States, residing at Bridgeport, in the county of Fairfield and State of Connecticut, have invented certain new and useful Improvements in Machines for Setting Lacing-Hooks; and I do hereby declare the following to be a full, clear, and exact description of the invention, such as will enable others skilled in the art to which it appertains to make and use the same.

My invention has reference to machines for setting lacing-hooks to any desired material, such as shoe-uppers and the like, but especially refers to machines of this description which are provided with automatic means for feeding and guiding the hooks in succession to the setting devices; and it consists in the construction, arrangement, and combination of the several parts of which the machine is composed, as will be hereinafter more fully described and claimed.

Figure 1:
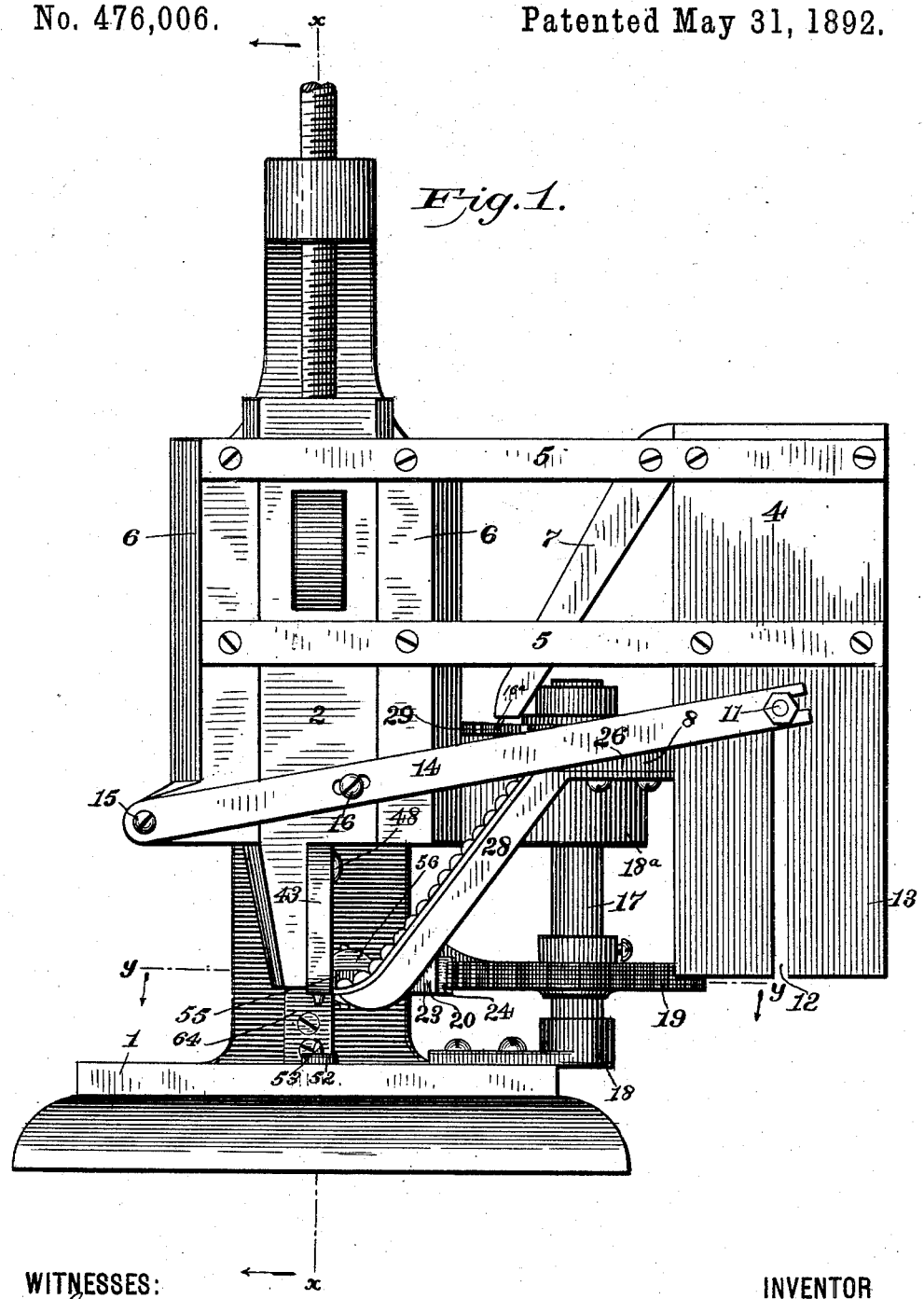
Figure 2:
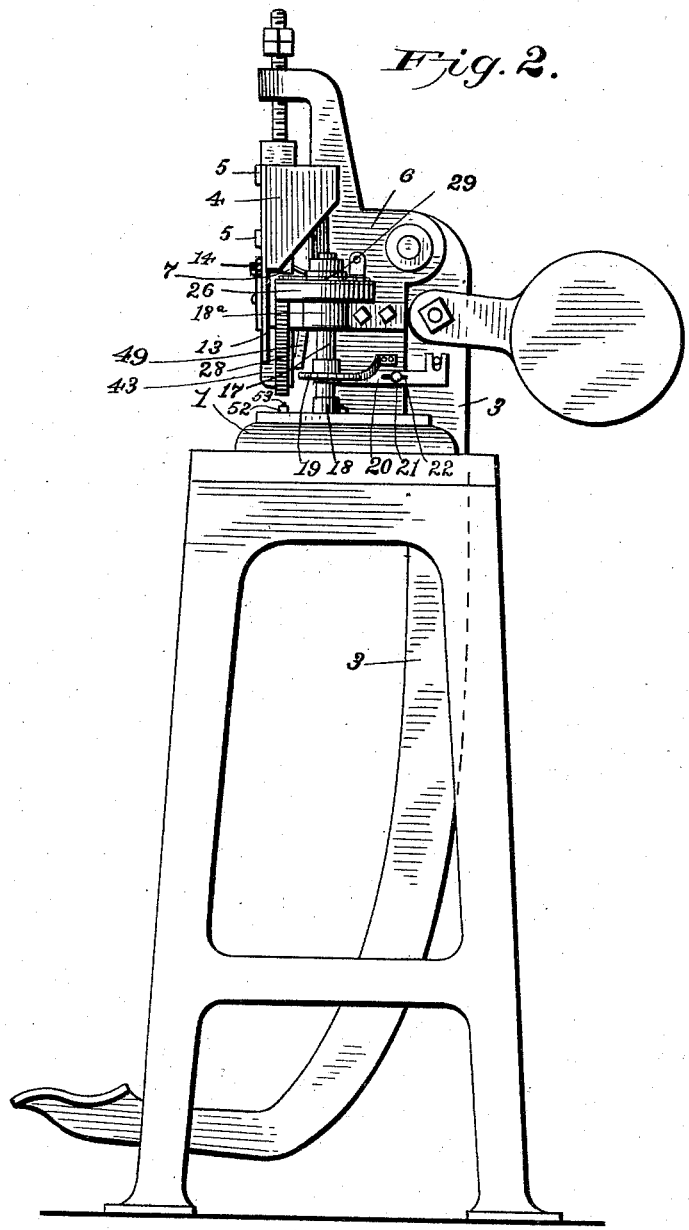
Figure 3:
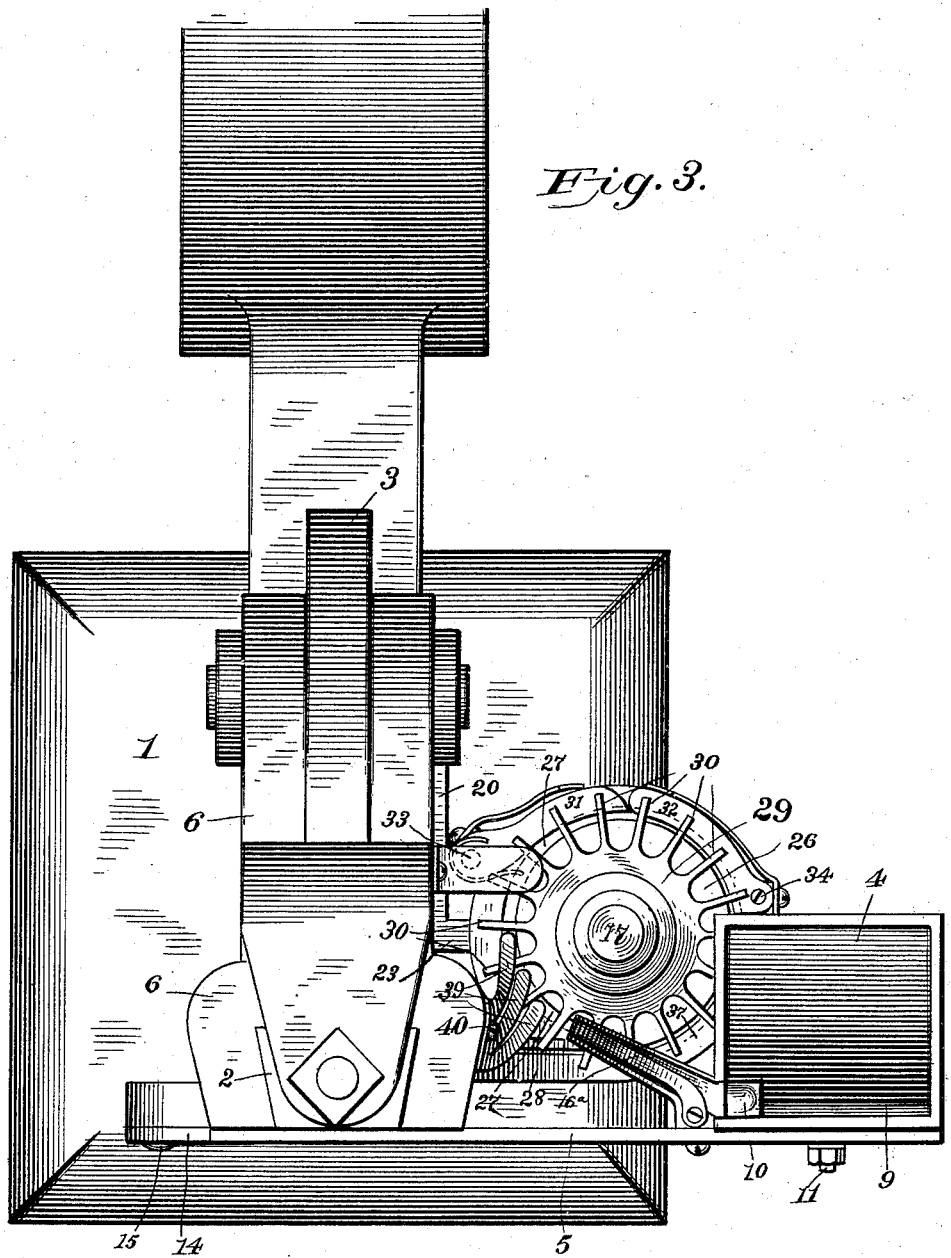
Figure 4:
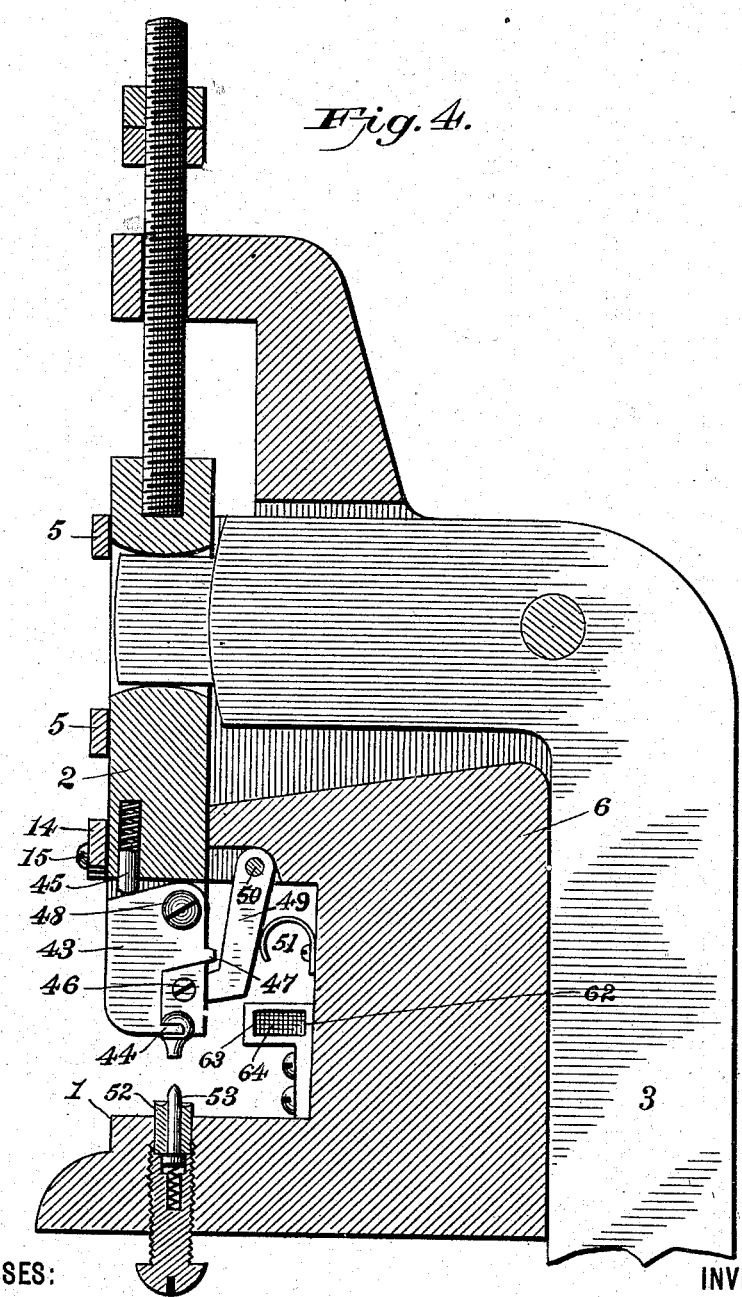
Figure 5:
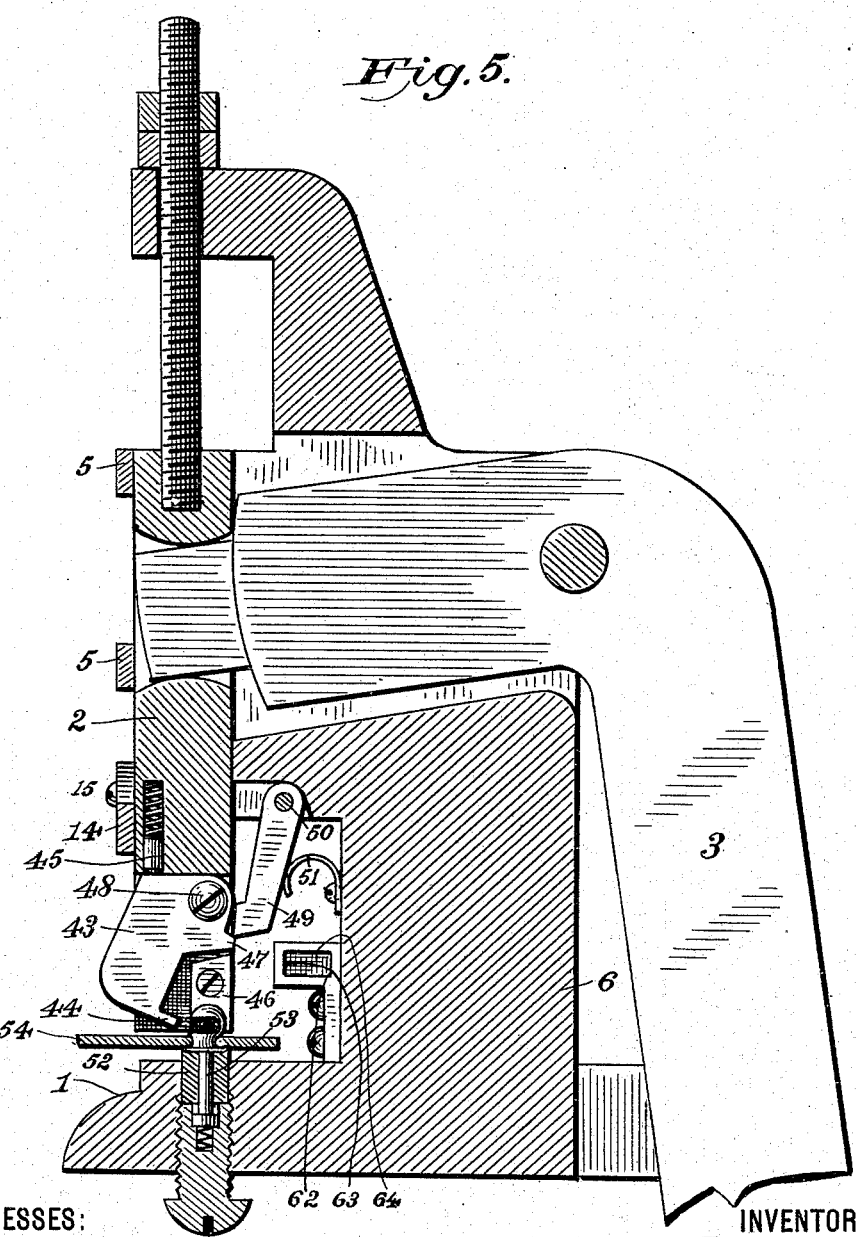
Figure 6:
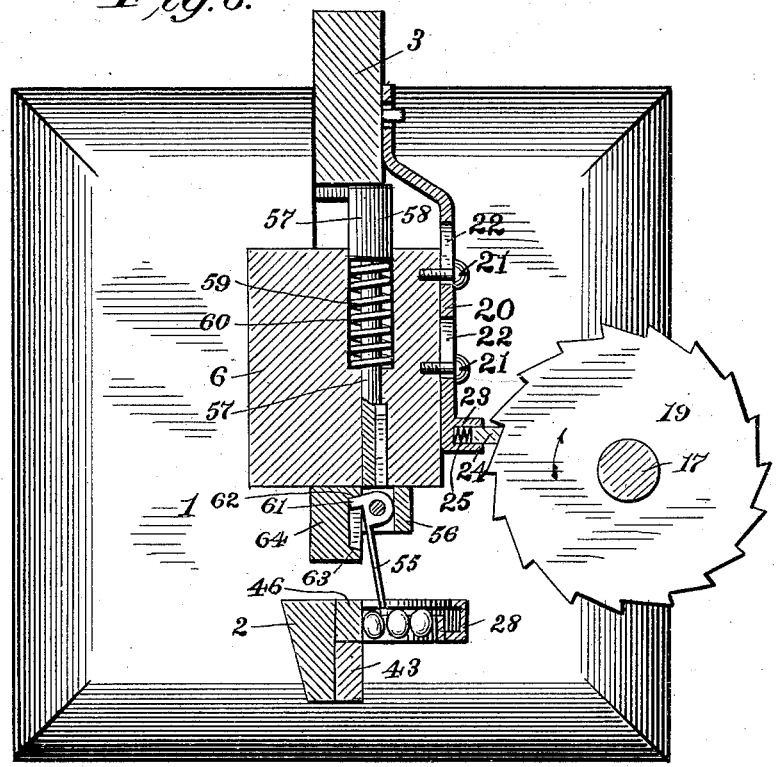
Figure 9:
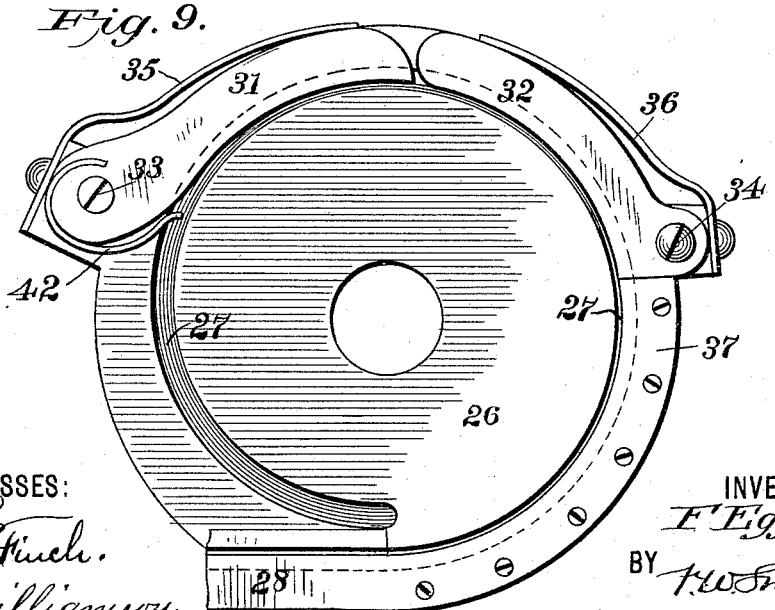
Figure 7:
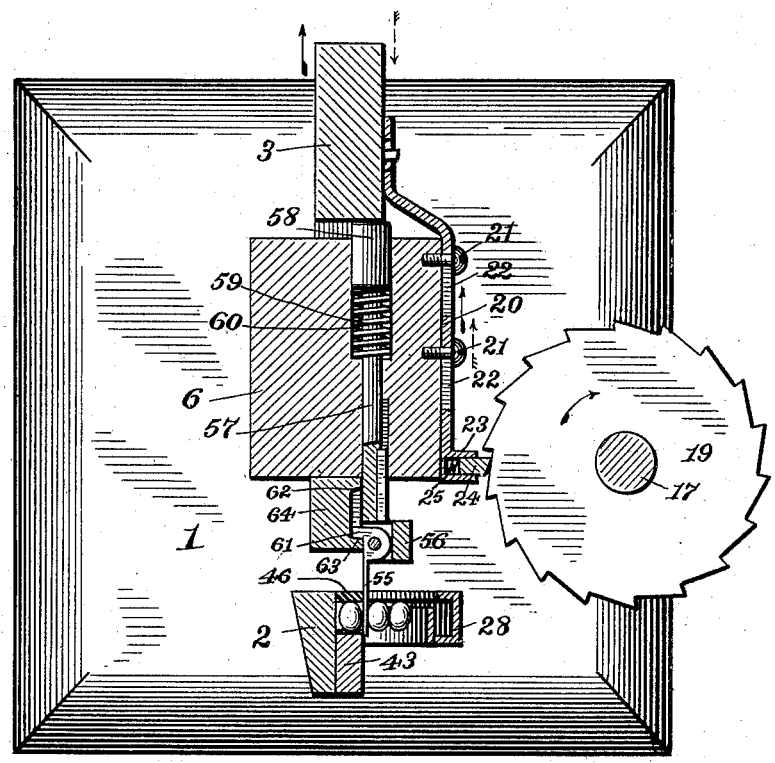
Figure 8:
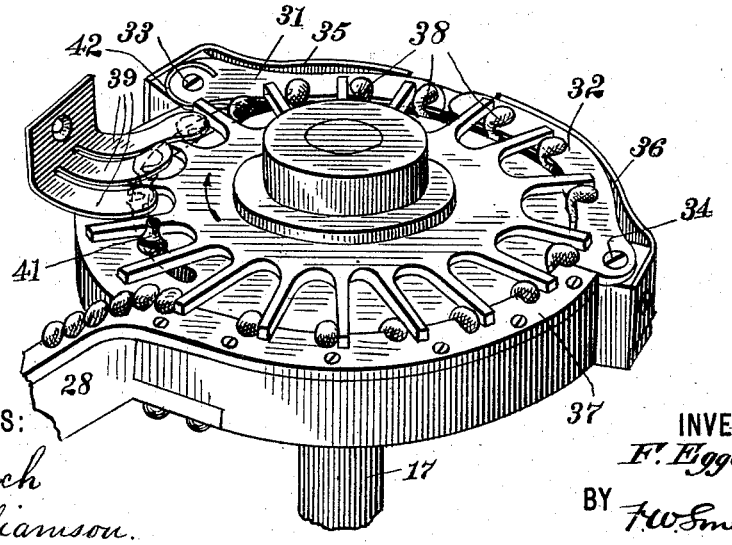
Figure 10:
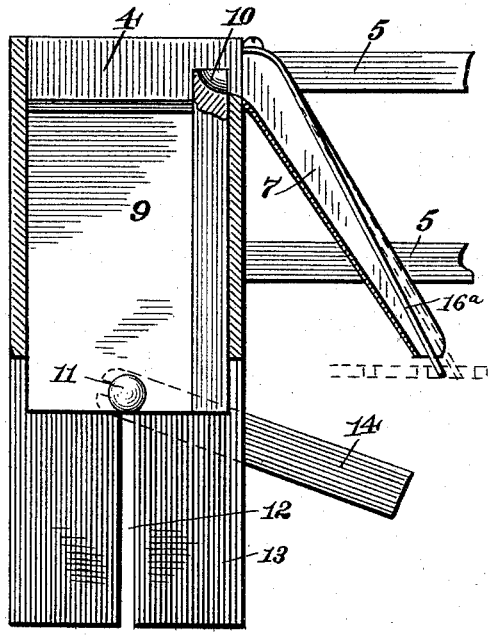
Figure 11:
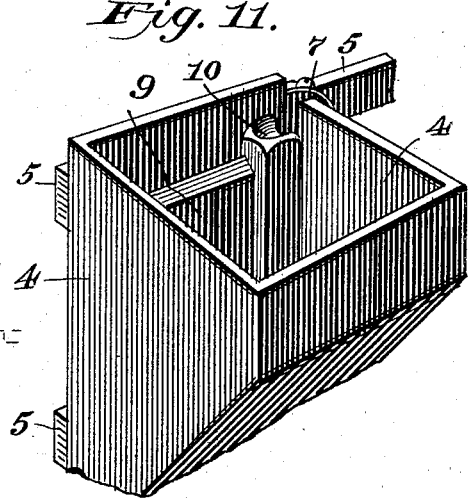

In the accompanying drawings, Figure 1 is a front elevation of my machine; Fig. 2, a side elevation; Fig. 3, a plan view; Figs. 4 and 5, detail broken sectional elevations at the line $x$ $x$ of Fig. 1 and showing, respectively, the arrangement of parts when in normal and operative positions. Figs. 6 and 7 are horizontal sections at the line $y$ $y$ of Fig. 1 and showing, respectively, the normal and effective positions of the devices which operate to deliver the hooks to the setting mechanism; Fig. 8, a detail perspective of the main feed-disk; Fig. 9, a plan of said disk with the spider removed; Fig. 10, a detail sectional elevation of the hopper and supply-chute; Fig. 11, a detail perspective of the hopper, and Fig. 12 a detail broken perspective of the setting-head and adjacent devices for delivering the hooks to said head.

Similar letters denote like parts in the several figures.

My invention is adapted to an ordinary foot-press, and it will of course be unnecessary to describe the latter.

1 is the bed, 2 the reciprocatory gate, and 3 the foot-lever for operating said gate, all being well-known parts of a foot-press.

4 is the hopper, which is fixed to cross-bars 5, that are secured to the standard 6.

7 is the supply-chute leading from the top of the hopper to a point immediately above the feed-scroll 8.

9 is a guide-block within the hopper and extending through the bottom thereof and capable of a free vertical reciprocation.

10 is a cup carried by said block and leading, when the block is in elevated position, directly into the chute 7.

11 is a stud extending laterally from the bottom of the block through an elongated slot 12 in a tail-piece 13, which latter is a projection of the front wall of the hopper.

14 is a rod pivoted at 15 to the standard 6 and loosely connected to a stud 16, projecting from the gate 2 and to the stud 11, so that said rod, and consequently the hopper, will be vertically reciprocated by the movements of the gate. At the downward movement of said gate the cup 10 will be buried within the mass of hooks within the hopper, and when said gate is elevated the cup will be raised, carrying a hook therein, and will deposit said hook within the supply-chute 7. It is intended that a single hook only should be selected by the cup; but it often happens that two hooks will be simultaneously deposited within the chute from the cup, and I would therefore state that it is immaterial whether one, two, or more hooks are deposited within the chute at the same time as long as they do not get wedged, so as to clog said chute. It is impossible, however, for the cup to carry more than two hooks at one time, and therefore there can be no danger of clogging.

I have provided the chute 7 with a guard 16$^a$ to prevent the hooks from accidentally bounding out of the chute. This guard is of course so pliable as not to obstruct in the slightest degree the passage of the hooks to the main feed.

The above-described hopper, cup, and chute constitute what I have termed the "subsidiary feed," and I will now proceed to describe the main-feed mechanism, which receives the hooks from the supply-chute, properly assembles them, and delivers them into the feed-chute preparatory to the operation of the setting devices.

17 is a vertical shaft journaled within brackets 18 18$^a$, which extend laterally from the standard 6. 19 is a ratchet-wheel rigidly secured on said shaft.

20 is a pawl-carrier properly secured to the lever 3 and guided by means of pins 21, which extend through slots 22 in said carrier within the standard 6. In the head of this carrier is a box 23, within which is a pawl 24, backed by a coil-spring 25, said pawl adapted to operate to turn the wheel 19 when the lever 3 is thrown back to lower the gate 2.

26 is the main feed-disk, secured to the bracket 18ª and having in its face a scroll-groove 27, the inner end of which groove is immediately below the lower end of the chute 7, while the outer end leads directly into the feed-chute 28, which latter is secured to the disk 26. It therefore will be clearly understood that a hook which falls from the supply-chute 7 within the groove 27 will, if pushed throughout said groove, enter the feed-chute 28.

29 is a spider rigidly secured to the shaft 17 and resting on the disk 26. 30 are legs which extend radially from said spider athwart the groove 27. The function of these legs is to push the hooks around throughout the groove into the feed-chute 28.

31 32 are dogs pivoted at 33 and 34 to the disk 26, and 35 36 are springs which bear against the outer edges of said dogs to force the latter inward, so that they normally overhang the groove 27.

37 is a ledge, which abuts against the end of the dog 32 and also overhangs the groove 27. As the hooks 38 are properly arranged by devices to be presently explained, they will, when pushed by the legs 30, assume a position with the heads thereof resting upon the dogs, the lower portion of the hooks being within the groove. The continued pushing of the hooks by the legs will force said hooks along the ledge 37 and out of the said groove within the chute 28. The ledge is extended so as to overhang the feed-chute, as shown at Figs. 8 and 9, and the hooks slide down said chute with their heads resting upon said ledge, as shown at Figs. 1, 6, 7, and 8. The width of the groove 27 is not sufficient to admit the heads of the hooks, and if the shanks of the latter do not arrange themselves within said groove as the hooks drop from the supply-chute there are certain devices which I will now describe that act on the hooks to properly assemble the shanks within the groove.

39 are spring-tongues preferably formed from a single piece of spring-steel and secured to the standard by a screw 40, as shown at Figs. 3 and 8. These tongues extend across the vertical plane of the groove 27 and close to the upper edges of the legs 30. Hooks whose shanks are not within the groove, as is shown in the instance of the hook numbered 41 in Fig. 8, will be forced by the legs 30 against and beneath said tongues with the result that the shanks will be properly arranged within said groove. I have shown three of these tongues, but it will of course be understood that the number of said tongues is immaterial, and, in fact, these tongues are not absolutely necessary, although I consider that the machine would be incomplete without them or some other ordinary device for arranging the hooks. After the hooks pass beyond the tongues it becomes necessary that the heads of said hooks should extend in the same direction, so that they will engage with the dogs 31 32, and thence be forced into the feed-chute. I have therefore provided a spring-finger 42, which extends part way across the groove 27, the hooks being forced against said finger by the action of the spider, the result being that said hooks will be turned so that their heads project in the same direction across the upper edge of the dog 31.

I have heretofore described the instrumentalities whereby the hooks are fed and brought into the position preparatory to the operation of the devices which deliver said hooks to the setting mechanism, and I will now describe such mechanism and devices.

Pivoted at 48 within the foot of the gate 2 is the setting-head 43, having a toe 44 extending inwardly from the lower extremity thereof.

45 is a spring-bolt, which bears against the upper edge of the head 43 to normally keep the latter in the position shown at Fig. 4.

Figure 12:
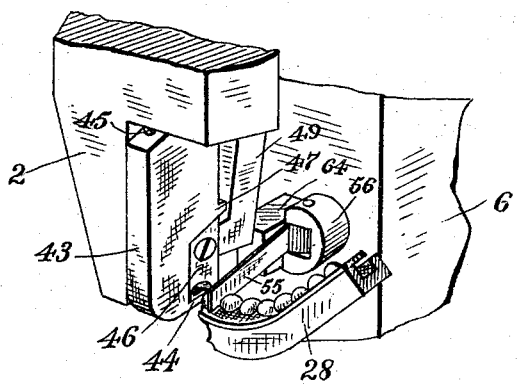

46 is a reinforce-block secured to the foot of the gate and having its bottom conformed to the shape of the hook-head, as will be understood by reference to Figs. 4, 5, and 12. The normal position of the toe 44 is below the block 46, so that when a hook is forced on said toe, as will be presently explained, the head of said hook will fit snugly within the bottom of said block. The lower end of the feed-chute 28 leads directly beneath the block when the gate is in its elevated or normal position, so that the hooks may be forced from said chute upon the toe 44.

47 is a lug, which extends inwardly from the head 43 beyond the pivotal point 48.

49 is a dog pivoted at 50 to the standard 6, and 51 is a spring, which acts against said dog to keep the latter normally projected immediately beneath the lug 47, as shown at Fig. 4. When the gate descends, the lug 47 will engage said dog and merely throw it aside without affecting the position of the head 43; but when said gate ascends the lug will strike against the dog, and thereby cause the head to be thrown outwardly, as shown at Fig. 5.

52 is the setting-block secured within the bed 1, and 53 is the ordinary resilient setting-pin central of said block. Presupposing a hook to have been forced upon the toe 44, as shown at Fig. 4, the downward movement of the press-gate will cause the hook to be set within a piece of leather 54 or other material, as shown at Fig. 5, and the initial upward movement of the gate will cause the lug to strike the dog 49, and thereby throw the toe out of the hook, whereby the latter is free from the machine, as is also shown at Fig. 5.

55 is a push-bar, which is pivoted within the head 56 of a plunger 57, which latter has a free reciprocatory movement through the standard 6 from front to rear. The heel 58 of this plunger projects rearwardly from the standard and is kept in constant contact with the foot-lever 3 by the action of a coil-spring 59, housed within a recess 60 in the standard and bearing effectively against said heel. The bar 55 has an ear 61, which extends laterally between abutments 62 63, formed on a bracket 64, secured to the standard. When the lever 3 is thrown backward by the foot of the pressman, the plunger will be retracted by the spring 59 and the ear 61 will strike against the abutment 62, thereby deflecting the push-bar, as shown at Fig. 6. The location and length of this bar are such that when the latter is in the position shown at Fig. 6 it is in the immediate rear of the lowermost hook in the chute 28, and when the plunger 57 is driven forward the bar will pass behind said hook and the ear 61 will strike the abutment 63, thereby impelling the bar toward the setting-head 43 and causing said hook to be forced beneath the block 46 and upon the setting-toe 44, as shown at Figs. 4 and 7. This operation of the push-bar will be more clearly understood by reference to Fig. 12, wherein the position of the bar is shown at the moment when the ear 61 is about to strike the abutment 63.

From the foregoing description it will be understood that the feeding of the hooks within the chute 28 takes place during the downward movement of the gate, while the return of the foot-lever to normal position effects the delivery of the hooks to the setting devices. When a hook is properly supported on the setting-toe, the shank of said hook will depend beneath said toe, as shown at Figs. 1 and 4, so that it will be seen that the hooks are set to the leather or other material on the upper face thereof. This is a great advantage over the hook-setting machines commonly used, since the hooks having been heretofore assembled within a setting-head on the bed of the machine, so that the shanks project upward, it has been necessary for the operator to place the leather or other material upon the hooks, thereby completely hiding them from view. The manipulation of a piece of leather over and upon the hooks frequently drags the latter out of place, so that the setting-tool frequently smashes the hooks. Again, the hooks being hid from view by the leather any inaccuracies in the operation of setting are not noticed at the time. In my machine the hooks are at all times in view of the operator, so that he can readily detect a defective hook or note any inaccuracy in the setting.

I desire to call especial attention to one peculiarity which my machine possesses—namely, the setting of the hooks into any suitable material without previously perforating the latter. Usually in the instance of shoe-uppers the latter have been perforated to accommodate the shanks of the lacing-hooks, and while my machine is especially adapted to set the hooks through such perforations, still the shank of the hook, depending from the setting-toe as it does, constitutes a natural punch and will readily cut its own way through the leather prior to the setting operation. This peculiarity I propose to utilize by properly locating the first hook in the leather, and then, since the hooks are always set from above, causing the hook last set to act as a guide and spacer for the succeeding hook.

Having thus described my invention, what I claim as new, and desire to secure by Letters Patent, is—

1. In a machine for setting lacing-hooks, the combination, with subsidiary and main feeding-chutes, of a spirally-grooved disk interposed between the said chutes, the said chutes being connected with the opposite ends of the said groove, a means for placing the hooks around the same groove, a spiral finger projecting partly across the said groove, and devices for delivering said hooks to the setting appliances, substantially as described.

2. The combination of the feed-disk having scroll groove and the rotary spider having legs extending athwart said groove with the spring-tongues which extend laterally immediately above said legs and operative hook-setting mechanism, substantially as shown and described.

3. The combination of the feed-disk having scroll groove and the rotary spider having legs extending athwart said groove with the resilient dogs pivoted to said disk and overhanging said groove and operative hook-setting mechanism, substantially as set forth.

4. The combination of the feed-disk having scroll groove and the rotary spider having legs extending athwart said groove with the spring-finger projecting within the groove and operative hook-setting mechanism, substantially as set forth.

5. The combination of the feed-disk having scroll groove, the rotary spider having legs extending athwart said groove, and the devices for properly arranging the hooks within the groove with the feed-chute into which said groove leads, the ledge which overhangs said groove and chute, and thereby affords a guideway for the uniform delivery of the hooks to the setting devices, and operative hook-setting mechanism, substantially as shown and set forth.

6. In a machine for setting lacing-hooks, the combination of the feed-disk having a scroll groove within which the hooks are assembled, a feed-chute which leads from said groove to the setting devices, a ledge which overhangs said chute and a portion of said groove, means for manipulating the hooks and forcing them upon said ledge with their heads hooked over the latter, and operative hook-setting mechanism, substantially as shown and set forth.

7. In a machine for setting lacing-hooks, the combination of the vertically-reciprocatory press-gate, the reinforce-block secured to the lower end thereof, the setting-head pivoted to said gate and having a toe extending in normal position below said block, the feed-chute leading immediately beneath said block, and means for successively forcing the hooks from said chute upon said toe, substantially as set forth.

8. In a machine for setting shoe-lacing hooks, the combination of the vertically-reciprocatory gate and devices carried thereby for holding the hooks during the operation of setting, with a feed-chute, a pivoted push-bar longitudinally movable in a path at approximately right angles to the said chute, means for oscillating the said push-bar on its pivot toward the said holding devices upon the completion of the forward movement of the said push-bar, whereby the said oscillating portion of the push-bar will force the hooks from the feed-chute upon the holding devices, and means for imparting an oscillation in the opposite direction to the said push-bar at the opposite end of its stroke, substantially as described.

9. In combination with the devices carried by a vertically-moving head for holding the hooks during the setting, and the feed-chute whereby the hooks are led to said devices, the pivoted push-bar having a reciprocatory movement transversely to the chute and in the immediate rear of the lowermost hook in the latter, and an abutment engaging the said push-bar upon a reciprocating motion thereof for throwing said bar toward said devices, whereby said hook is delivered to said devices, substantially as set forth.

10. The combination of the reciprocatory head 56, the push-bar pivoted therein and provided with ear 61, the abutments 62 63, the feed-tube, and the devices carried by a vertically-moving head for holding the hooks during the setting, substantially as set forth.

11. The combination of the foot-lever, the resilient plunger within the standard and having constant contact with said lever, the head 56 on the inner end of said plunger, the push-bar pivoted to said head and having a laterally-extending ear, and the bracket 64, having abutments 62 63, against which said ear strikes at the respective limits of its backward and forward movements, whereby said push-bar is vibrated laterally, substantially as set forth.

12. The combination of the vertically-reciprocatory press-gate, the reinforce-block secured to the lower end thereof, the setting-head pivoted to said gate and having a toe extending in normal position below said block, the feed-chute leading immediately beneath said block, the push-bar having a reciprocatory movement transverse to said chute and also a lateral vibration, whereby the lowermost hook is selected by said bar, and thereby forced beneath said block and upon said toe, substantially as shown and set forth.

13. In a machine for setting lacing-hooks, a setting-head which holds the hooks during the operation of setting and is carried by the reciprocatory gate of a press, in combination with a pivoted and reciprocating push-bar actuated by a power-lever for forcing the hooks on said head with their shanks depending and with a spring-pressed plunger bearing upon the said power-lever and carrying the said push-bar, substantially as shown and described.

14. In a machine for setting lacing-hooks, the combination, with the setting-head pivoted to the press-gate and adapted in normal position to receive the hooks, of means comprising a spring-pressed dog engaging a lug upon the head for swinging said head outwardly during the initial movement of said gate, whereby the hooks when set are released, substantially as set forth.

15. The combination of the setting-head pivoted to the gate and having lug 47, and the dog 49, pivoted to the standard and adapted to engage with said lug on the initial movement of said gate, whereby said head is swung outwardly, substantially as set forth.

16. In a machine for setting lacing-hooks, the combination, with the setting-block secured in the bed of the machine, suitable setting mechanism, and the devices for holding the hooks during the setting carried by the reciprocatory press-gate, of means including a horizontal spirally-grooved disk having a spindle rotating thereon for assembling and feeding the hooks and instrumentalities for delivering the hooks shank downward to said devices, substantially as set forth.

17. The combination, with a reciprocating gate and a stationary setting-head, of a stationary feed-chute and a positive feeding device therefor, a setting-head having a lug thereon and pivoted to the gate and swinging in a plane at right angles to the lower end of the said feed-chute, a reinforcing-block mounted on the said gate and normally above the lower end of the said pivoted setting-head, and a pivoted dog adapted to trip the said pivoted setting-head upon the beginning of an upward movement of the said gate, substantially as described.

In testimony whereof I affix my signature in presence of two witnesses.

FREDERICK EGGE.

Witnesses:
F. W. SMITH, Jr.,
J. S. FINCH.